United States Patent
Podnar

(10) Patent No.: US 10,272,572 B2
(45) Date of Patent: Apr. 30, 2019

(54) REMOTELY CONTROLLING ROBOTIC PLATFORMS BASED ON MULTI-MODAL SENSORY DATA

(71) Applicant: The Boeing Company, Chicago, IL (US)

(72) Inventor: Gregg W. Podnar, Seattle, WA (US)

(73) Assignee: The Boeing Company, Chicago, IL (US)

( * ) Notice: Subject to any disclaimer, the term of this patent is extended or adjusted under 35 U.S.C. 154(b) by 439 days.

(21) Appl. No.: 15/179,493

(22) Filed: Jun. 10, 2016

(65) Prior Publication Data

US 2017/0355080 A1    Dec. 14, 2017

(51) Int. Cl.
*B25J 9/16* (2006.01)
*B25J 11/00* (2006.01)
(Continued)

(52) U.S. Cl.
CPC ............ *B25J 9/1697* (2013.01); *B25J 5/00* (2013.01); *B25J 9/1687* (2013.01); *B25J 9/1689* (2013.01);
(Continued)

(58) Field of Classification Search
CPC ...... B25J 9/1697; B25J 13/025; B25J 19/023; B25J 11/005; B25J 9/1689; B25J 5/00;
(Continued)

(56) References Cited

U.S. PATENT DOCUMENTS

| 10,023,250 B2 | 7/2018 | Podnar |
| 2002/0058929 A1* | 5/2002 | Green ........................ B25J 3/04 606/1 |

(Continued)

FOREIGN PATENT DOCUMENTS

| EP | 2653273 A1 | 10/2013 |
| WO | 2011116332 A2 | 9/2011 |
| WO | 2012129251 A2 | 9/2012 |

OTHER PUBLICATIONS

"GB Application Serial No. 1708992.1, Combined Search and Examination Report dated Dec. 1, 2017", 10 pgs.

(Continued)

*Primary Examiner* — Adam R Mott
(74) *Attorney, Agent, or Firm* — Kwan & Olynick LLP

(57) ABSTRACT

Provided are methods and systems for remotely controlling of robotic platforms in confined spaces or other like spaces not suitable for direct human operation. The control is achieved using multi-modal sensory data, which includes at least two sensory response types, such as a binocular stereoscopic vision type, a binaural stereophonic audio type, a force-reflecting haptic manipulation type, a tactile type, and the like. The multi-modal sensory data is obtained by a robotic platform positioned in a confined space and transmitted to a remote control station outside of the confined space, where it is used to generate a representation of the confined space. The multi-modal sensory data may be used to provide multi-sensory high-fidelity telepresence for an operator of the remote control station and allow the operator to provide more accurate user input. This input may be transmitted to the robotic platform to perform various operations within the confined space.

19 Claims, 8 Drawing Sheets

(51) Int. Cl.
*B25J 13/08* (2006.01)
*B25J 5/00* (2006.01)
*B25J 13/02* (2006.01)
*B25J 19/02* (2006.01)

(52) U.S. Cl.
CPC .......... *B25J 11/005* (2013.01); *B25J 11/0075* (2013.01); *B25J 13/025* (2013.01); *B25J 13/084* (2013.01); *B25J 13/085* (2013.01); *B25J 19/023* (2013.01); *Y10S 901/44* (2013.01)

(58) Field of Classification Search
CPC .... B25J 13/084; B25J 11/0075; B25J 9/1687; B25J 13/085; Y10S 901/44
See application file for complete search history.

(56) References Cited

U.S. PATENT DOCUMENTS

| | | |
|---|---|---|
| 2002/0153185 A1 | 10/2002 | Song et al. |
| 2014/0114482 A1 | 4/2014 | Slawinski et al. |
| 2015/0148949 A1 | 5/2015 | Chin et al. |
| 2015/0346722 A1 | 12/2015 | Herz et al. |
| 2016/0089211 A1* | 3/2016 | Bowling ................ A61B 19/22 606/130 |
| 2016/0303739 A1* | 10/2016 | Apkarian .................. B25J 3/04 |
| 2017/0355405 A1 | 12/2017 | Podnar |

OTHER PUBLICATIONS

Podnar, Gregg W. et al, "Stereoscopic Camera and Associated Method of Varying a Scale of a Stereoscopic Image Pair", U.S. Appl. No. 15/179,542, filed Jun. 10, 2016, 36 pgs.

Podnar, Gregg W. et al, "Multi-Tread Vehicles and Methods of Operating Thereof", U.S. Appl. No. 15/179,473, filed Jun. 10, 2016, 79 pgs.

Grinberg, Victor S. et al., "Geometry of Binocular Imaging", Robotics Institute, School of Computer Science, 1994, 9 pgs.

Schloerb, David W. , "A Quantitative Measure of Telepresence", Presence, vol. 4, No. 1, 1995, pp. 64-80.

"U.S. Appl. No. 15/179,473, Notice of Allowance dated Mar. 7, 2018", 8 pages.

* cited by examiner

REMOTELY CONTROLLING ROBOTIC PLATFORMS BASED ON MULTI-MODAL SENSORY DATA

CROSS-REFERENCE TO RELATED APPLICATIONS

This application is related to U.S. patent application Ser. No. 15/179,473, entitled "Multi-Tread Vehicles and Methods of Operating Thereof" filed concurrently on 2016 Jun. 10 and issued as U.S. Pat. No. 10,023,250 on 2018 Jul. 17 and U.S. patent application Ser. No. 15/179,542, entitled "Stereoscopic Camera and Associated Method of Varying a Scale of a Stereoscopic Image Pair" filed concurrently on 2016 Jun. 10 and issued as U.S. Pat. No. 9,953,40 on 2018 Apr. 24, both of which are incorporated herein by reference in their entirety for all purposes.

TECHNICAL FIELD

Methods and systems for controlling robotics platforms are provided and, more particularly, a robotic platform remotely disposed in a confined space and controlled using remote and/or local control instructions generated based on multi-modal sensory data is provided in accordance with some embodiments.

BACKGROUND

Robotic platforms may be deployed into various environments that are not ideal for direct human operation. Tele-operated robotic systems including robotic platforms can be used to perform remote operations in such environments with some input from operators positioned remotely. However, operators' perception of operating environments is limited by the sensory fidelity level of the system. For such systems to be effective, the operators must be effectively tele-present in the operating environments with sufficient and truthfully sensory feedback. In general, higher sensory fidelity provided to an operator yields greater sense of presence in the operating environment and more effective operating instructions provided by the operator. On the flip side, the remote control can be very challenging when a lack of some sensory experience results in limited situation awareness. In most conventional tele-operated robotic systems, operators have limited information about actual operating environments. The primary sensory feedback is visual. Even robotic platforms with sophisticated vision systems provide limited information to their operators. Humans naturally rely on multiple senses to learn about their environment and not only vision. Limiting operators to visual information restricts operator's ability to comprehensively understand the environment and provide necessary instructions. Furthermore, typical tele-robotic systems suffer from what is called "cyclopean vision." Specifically, such systems include monoscopic cameras and displays that provide no binocular stereopsis. Depth cues are critical for understanding of the environment and performing various operations in this environment, such as manipulation tasks and, more so, for fine manipulation tasks. Each variety of distortion introduced impairs the operator's ability to work precisely and can cause fatigue with prolonged use.

SUMMARY

Provided are methods and systems for remotely controlling of robotic platforms in confined spaces or other like spaces not suitable for direct human operation. The control is achieved using multi-modal sensory data, which includes at least two sensory response types, such as a binocular stereoscopic vision type, a binaural stereophonic audio type, a force-reflecting haptic manipulation type, a tactile type, and the like. The multi-modal sensory data is obtained by a robotic platform positioned in a confined space and transmitted to a remote control station outside of the confined space, where it is used to generate a representation of the confined space. The multi-modal sensory data may be used to provide multi-sensory high-fidelity telepresence for an operator of the remote control station and allow the operator to provide more accurate user input. This input may be transmitted to the robotic platform to perform various operations within the confined space.

In some embodiments, a method for remotely controlling of a robotic platform based on multi-modal sensory data is provided. The method may comprise positioning the robotic platform, communicatively coupling the robotic platform to a remote control station, obtaining the multi-modal sensory data using two or more sensors of the robotic platform, transmitting at least a portion of the multi-modal sensory data, and receiving remote control instructions from the remote control station at the robotic platform. The multi-modal sensory data may comprise at least two sensory response types. The at least two sensory response types may be selected from the group consisting of a binocular stereoscopic vision type, a binaural stereophonic audio type, a force-reflecting haptic manipulation type, and a tactile type. Obtaining the multi-modal sensory data and transmitting the multi-modal sensory data may be repeated continuously during execution of the method. The method may involve augmenting the remote control instructions received from the remote control station. In some embodiment, the structure is an aircraft wing.

In some embodiments, the robotic platform is positioned in a confined space of a structure. Transmitting at least the portion of the multi-modal sensory data may be performed while the robotic platform is positioned in the confined space.

In some embodiments, the method further comprises generating local control instructions at the robotic platform based on the multi-modal sensory data. The method may also comprise performing one or more operations within the confined space using the robotic platform based on the local control instructions.

In some embodiments, the multi-modal sensory data comprising at least the binocular stereoscopic vision type, the binaural stereophonic audio type, and the force-reflecting haptic manipulation type. In these embodiments, the one or more operations may comprise drilling the component of the structure.

In some embodiments, the multi-modal sensory data may comprise at least the binocular stereoscopic vision type, the binaural stereophonic audio type, the force-reflecting haptic manipulation type, and the tactile type. In these embodiments, the one or more operations comprise installing the fastener into the structure.

In some embodiments, the method further comprises augmenting the multi-modal sensory data prior to transmitting at least the portion of the multi-modal sensory data. The method may also comprise selecting at least the portion of the multi-modal sensory data for transmitting.

In some embodiments, the method further comprises performing one or more operations within the confined space using the robotic platform based on the remote control instructions received from the remote control station at the robotic platform. For example, the one or more operations are selected from the group consisting of changing position of the robotic platform within the confined space, drilling a component of the structure, installing a fastener into the structure, sealing the structure, painting the structure, removing an object from a confined space, and inspecting the structure. The fidelity level of the multi-modal sensory data may correspond to the one or more operations. In some embodiments, the fidelity level of the multi-modal sensory data changes over time. In some embodiments, the one or more operations are performed also based on local control instructions generated at the robotic platform such that the local control instructions are combined with the remote control instructions to perform the one or more operations.

In some embodiments, the one or more operations comprise changing the position of the robotic platform within the confined space. In these embodiments, the multi-modal sensory data may comprise at least the binocular stereoscopic vision type and the stereoscopic audio type.

In some embodiments, the robotic platform is communicatively coupled to the remote control station using a local area network. In the same or other embodiments, the robotic platform is communicatively coupled to the remote control station using at least one wireless communication link. Furthermore, the robotic platform is communicatively coupled to the remote control station using a global communication network.

Also provided is a method for remotely controlling of a robotic platform in a confined space of a structure based on multi-modal sensory data. The method may comprise receiving the multi-modal sensory data from the robotic platform positioned in the confined space, generating a representation of the multi-modal sensory data by the remote control station, capturing user input at the remote control station, and transmitting remote control instructions to the robotic platform positioned in the confined space. The multi-modal sensory data is received by a remote control station positioned outside of the confined space and communicatively coupled to the robotic platform. The multi-modal sensory data comprises at least two sensory response types selected from the group consisting of a binocular stereoscopic vision type, a binaural stereophonic audio type, a force-reflecting haptic manipulation type, and a tactile type; and In some embodiments, generating the representation of the multi-modal sensory data comprises augmenting the multi-modal sensory data based on at least one of video spectrum, audio spectrum, spatial orientation, and proprioception. The representation may be a multi-sensory high-fidelity telepresence. In some embodiments, the user interface of the remote control station comprises a 3D display for presenting the binocular stereoscopic vision type of the multi-modal sensory data. The user interface of the remote control station may comprise stereo speakers for presenting the binaural stereophonic audio type of the multi-modal sensory data.

In some embodiments, the remote control instructions represent one or more operations performed by the robotic platform within the confined space. The one or more operations may be selected from the group consisting of: changing position of the robotic platform within the confined space, drilling a component of the structure, installing a fastener into the structure, sealing the structure, painting the structure, removing an object from a confined space, and inspecting the structure.

In some embodiments, at least receiving the multi-modal sensory data and generating the representation are performed continuously. Furthermore, the remote control instructions may be generated based on the user input. The robotic platform may be communicatively coupled to the remote control station using a local area network. In the same or other embodiments, the robotic platform is communicatively coupled to the remote control station using a global communication network.

Also provided is a robotic platform for operating in a confined space of a structure using multi-modal sensory data. The robotic platform may comprise sensors for generating the multi-modal sensory data and a communication module for communicatively coupling to a remote control station positioned outside of the confined space. The sensors may comprise at least two selected from the group consisting of a binocular stereoscopic vision sensor, a binaural stereophonic audio sensor, a force-reflecting haptic manipulation sensor, and a tactile sensor.

Also provided is a remote control station for controlling a robotic platform using multi-modal sensory data. The robotic platform may comprise a communication module for communicatively coupling to the robotic platform and for receiving the multi-modal sensory data from the robotic platform and a user interface comprising an output device for generating a representation of the multi-modal sensory data received from the robotic platform. The multi-modal sensory data comprises at least two sensory response types. In some embodiments, the at least two sensory response types are selected from the group consisting of a binocular stereoscopic vision type, a binaural stereophonic audio type, a force-reflecting haptic manipulation type, and a tactile type.

Also provided is a method for remotely controlling of a robotic platform in a confined space of a structure based on multi-modal sensory data. The method may comprise obtaining the multi-modal sensory data using two or more sensors of the robotic platform, transmitting at least a portion of the multi-modal sensory data to a remote control station, and generating a representation of the multi-modal sensory data by the remote control station. The multi-modal sensory data comprising at least two sensory response types. Various other aspects of this method are presented above and elsewhere in this document.

These and other embodiments are described further below with reference to the figures.

DETAILED DESCRIPTION

Figure 1:
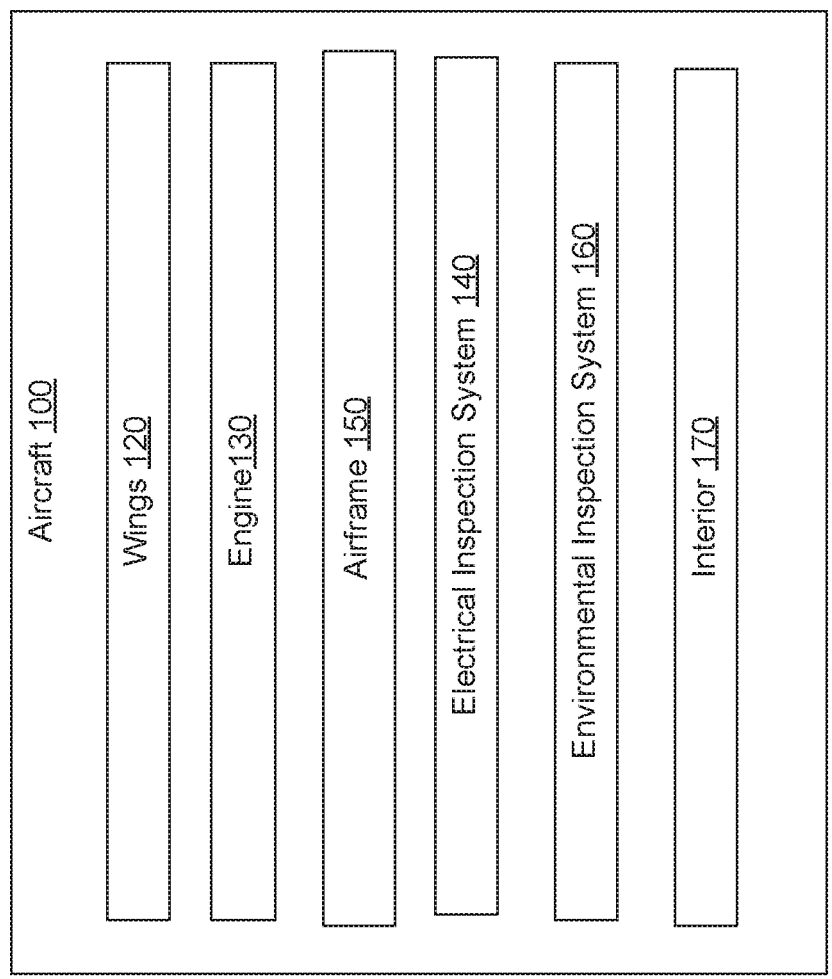
FIG. 1 is a schematic illustration of an aircraft having confined spaces, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the present disclosure as defined by the appended claims.

Introduction

Adding real-time human control to robotic platforms provide new opportunities for robotics. On one hand, it helps to overcome many challenges associated with fully automated systems. Furthermore, it allows to perform operations in environments not accessible by humans and/or operations not supported by the fully automated system.

Hybrid human-robotic systems can safely leverage individual strengths and achieve substantial synergies when sufficient information about operating environments is presented to human operators. For example, one key strength of robotic platforms is their ability to deploy and operate in various environments not readily accessible for humans, such as confined spaces, hazardous environment, and the like. (For purposes of this disclosure, confined space is defined as enclosed space defined by a cavity and access with the cavity depth being at least 5 times greater than the principal dimension of the access. At the same time, humans are able to operate well in complex and unstructured environments using their senses and cognitive abilities, which currently far exceed capabilities of fully-automated robotic system. Yet, these environmental complexities often access points in areas not accessible to or suitable for humans. For example, an interior of an aircraft wing is a complex environment with many different components that may need to be assembled, serviced, and replaced. The size or, more specifically, the thickness of the wing provides limited access to these components. It should be noted that position, size, and other characteristics of access points to the operating environment also limits access. The current wing design provide various access points designed for human operators. However, these accesses points may not desirable from weight, performance, and other considerations and generally should be smaller and less frequent, if possible.

Effective operation of a hybrid human-robotic system, which may be also referred to as a co-robotic system, depends on providing high fidelity telepresence to an operator so that the operator can provide correct user input. The fidelity level depends on sensory data obtained by a robotic platform present in an operating environment and in particular on different sensory modes of the data. In many instances, each separate sensory data type (e.g., vision) may be insufficient by itself for a human operator to have an adequate perception of the operating environment. In most instances, humans rely on multiple senses to generate their environmental perception.

Provided are apparatus, methods and systems for controlling of a robotic platform positioned in a confined space. The control is provided, at least in part, by a remote control station positioned outside of the confined space. Some level of control may be provided by the robotic platform itself, which may be referred to as an automated portion of the overall control. The control, internal and/or external, is based on multi-modal sensory data obtained by the robotic platform. This co-robotic approach removes human operators from confined spaces and provide safe and ergonomic work environments remotely. This approach allows performing operations in environments that may be not accessible to humans. Furthermore, it opens door to new types of operations that may not be performed directly by humans or unassisted by fully-automated robotic systems. It also opens the door to new structural configurations of operating environments that no longer have to accommodate a human. For example, a greater ratio of chord (Y-dimension) to depth (Z-dimension) in airfoils, lighter structures without the need for human sized access points, and other like features may be used on aircraft. For purposes of this disclosure, multi-modal sensory data is defined as data generated by one or more sensors of a robotic platform positioned in a confined space and corresponding (in a direct form or in an augmented form) to at least two types of different human senses.

Some level of automation may be provided by optional autonomous agents that may assist operators with their controls and/or may be responsible for selecting multi-modal sensory data for transmission and even altering multi-modal sensory data (e.g., scaling, changing sensory spectrums, and the like). These agents may be implemented on the robotic platform, remote control station, or both. Specifically, the robotic platform may perform some operations without any control instructions generated based on the user input. The control instructions for these operations may be generated by one or more autonomous agents based on the multi-modal sensory data. Some examples of these operations may include navigating the robotic platform within a confined space based on a target location and proximity of various surrounding components. Other examples may involve various operations having less complexity than, for example, operations performed based on user input.

In some embodiments, the methods and systems create situational awareness for an operator through immersive multi-sensory high-fidelity presence or, more specifically, telepresence. This type of situational awareness allows the operator to generate user input more accurately and more effectively without being actually present in the confined space where the multi-modal sensory data is obtained. In addition to the improved efficiency, the high fidelity allows controlling more complex operations. Similar to other instances with limitations on human sensory functions, limited sensory presence significantly constrains ability of an operator when performing a task.

Co-robotic system is designed to generate immersive multi-modal sensory feedback (e.g., a combination of vision and audition perceptions of the environment, in some cases combined with force sensing extremities). With such feedback, the operator working through the remote control station will have a more faithful sense of being in the environment and can employ the intuition and careful practices that an in-situ worker would use while ensuring safety. Furthermore, the intuition and practices of an operator, even remotely positioned can exceed some autonomous capabilities of current robotic platforms making control instructions generated based on user input (and understand of the operating environment) truly invaluable. In some embodiments, a visual component of the multi-modal sensory data may be achieved with a high-definition (e.g., 1920×1280 pixels with 24 bits per pixel of luminance and color data at 60 Hz per eye) geometrically-correct binocular stereoscopic remote viewing sensor. The audio component may be a full-range (e.g., 20 kHz bandwidth per ear) stereophonic audio through microphones linked to the visual tele-presence and reproduced to give the operator a natural aural situational awareness.

Other sensor modalities may include scalable force-reflecting manipulators, a scalable amplitude attitude platform driven by one or more inertial measurement sensors on the remote platform or its end effector, and remote tactile sensing with fingertip arrays of pressure and temperature reproducers and vibration reproduction. Other forms of sensory augmentation such as scaling (visual size and spectrum, force, and aural) may be used. The sensory data types may depend on the environment and performed operations. For example, a bulldozer operator may be presented with wide-angle high-definition monoscopic video, combined with full-range stereophonic audio, and an attitude reproducing platform with vibration reproduction. A racing car driver may add (reproduction of a wind speed by blowing air in the face of the operator and direction to gain better situation awareness. The environmental temperature (e.g., air temperature) may be also used as a factor. A surgeon may be presented with scaled high-definition stereoscopic vision, and scaled force-reflecting manipulators. Finally, an explosive ordnance disposal operator may add tactile sensing for finer manipulation.

In some embodiments, the methods and systems allow to scale the representation of the confined environment when, for example, this environment is presented on a user interface of a remote control station. For example, a tool performing an operation and controlled by hand manipulations of the operator may be substantially smaller than the operator's hand. The scaling may be used to represent the tool at a scale comparable to the size of the hand. It should be noted that different scaling may be used for different sensory data types and even for different subsets of data for the same sensory data type. For example, a visual representation may be scaled up while the force feedback may be scaled down (e.g., to avoid damaging operator's hand). In other words, the scaling is used to more effectively match the perception and sensory capabilities of the operator with a particular space and/or a task at hand.

For example, a one-to-one scale system would have manipulators the length of human arms and moving the same distances, which may be not suitable for an environment that needs smaller or larger manipulators. Now referring to visual scaling, the stereoscopic camera may be positioned at the same relative distance and position above the actuator as human eyes relative to hands. The stereoscopic camera may have the same inter-pupillary spacing as our eyes. For a two-to-one effective scale increase of the remote environment, the manipulators must be one-half the size of our arms, the distance from and elevation of the stereoscopic camera one-half of the previous distance and height, with the inter-pupillary distance one-half of our (human) inter-pupillary distance).

In some embodiments, the methods and systems augment the multi-modal sensory data based on sensory capabilities of the operator. The augmentation may be performed for different types of sensory data (e.g., imaging, audio, force, temperature, etc.) and even convert one type into another (e.g., creating a visual (colored) representation of a temperature map). This augmentation capability allows using sensory data that may be otherwise ignored if the operator is present in the actual operating environment. For example, an operator may not be capable of seeing infrared radiation (e.g., indicative of a temperature) or hearing outside of a common 20 Hz to 20 kHz (e.g., a sound outside of this range may indicate a particular type of friction forces). The data collected for such ranges may be converted into ranges recognizable by human operator. Furthermore, one sensory type may be presented in a form of another sensory type. For example, a temperature profile of a surface may be presented with different colors of a user interface of the remote control station.

In some embodiments, the methods and systems provide precise physical interaction through haptic teleoperation. Specifically, at least one component of the multi-modal sensory data may be based on senses of touch and proprioception. Various types of sensors (e.g., force sensor, temperature sensor, and the like) may be used on a robotic platform to generate haptic sensory data. Furthermore, the user interface may include various haptic output devices to generate representation of this data.

Overall, complex tasks in unstructured environments are more difficult to characterize and represent than repetitive tasks in well-structured settings, where robotic advancements are currently prevalent and where full robotic automation may be already possible. Operating in unstructured environments still rely on human abilities to understand the environment and provide at least some control instructions. However, operators need sufficient representations of such unstructured environments, which is addressed by utilizing multi-modal sensory data. A system including a robotic platform and a remote control station, which generates at least some control instructions for the robotic platform may be referred to as a co-robotic system or a hybrid robotic-human system. This type of system leverages capabilities of each component of the system. Specifically, it utilizes robotic platform capabilities of accessing various environments not suitable for humans, perform special tasks in the environment, and obtain multi-modal sensory data that, in some embodiments, may go beyond human sensory capabilities. The system may support sensory and cognitive augmentation as noted above.

Various sensors are positioned on a robotic platform to generate multi-modal sensory data. Each sensor may represent one end of a remote sensory channel. In some embodiments, a channel may include a monitoring agent, which may be responsible for modifying and/or augmenting data generated by the sensor and/or monitoring control instructions from the operator. For example, the monitoring agent may scale movements, limit accelerations, and/or apply soft limits to the control instructions. This scaling may be used to prevent collisions and other reasons. In some embodiments, different sensory types of the multi-modal sensory data are analyzed concurrently by the same monitoring agent. Furthermore, the data may be presented concurrently at the remote control station. Some examples of this data analysis include, but not limited to, building a 3D map of the operating space (which may be viewable by the operator at the user interface), identifying anomalous features (such as missing fasteners, or surface blemishes), and combining/overlaying different sensory types on the user interface.

The co-robotic systems described herein may include multi-modal tele-perception sensors for binocular stereoscopic vision, binaural stereophonic audition, and/or force-reflecting haptic manipulation. Robotic platforms of these systems may be controlled remotely while being deployed into confined/hazardous spaces. The robotic platforms may be specifically adapted to operating environments (e.g., space requirements, access, and the like) and operations to be performed by these platforms. For example, access through a relatively small convoluted passage may require a snake-like robot platform, while access on-orbit may require a free-flying robotic platform.

To provide better understanding of challenges associated with operating in confined spaces, one example of a confined space will now be described with reference to FIG. 1. Specifically, FIG. 1 is a schematic illustration of aircraft 100, in accordance with some embodiments. Aircraft 100 comprises airframe 150 with interior 170. Aircraft 100 includes wings 120 coupled to airframe 150. Aircraft 100 also includes engines 130 coupled to wings 120. In some embodiments, aircraft 100 further includes a number of operations systems 140 and 160 (e.g., avionics), further described below in conjunction with FIG. 8. Any of these aircraft components may have operating environments not easily accessible by humans and, at the same time, too complex for complete autonomous robotic operation. For example, wing 120 may include various ribs and other structural components limiting access within the interior of wing 120.

Overall, a robotic platform may be deployed into a confined area and/or a high-risk area, one into which humans should not or cannot be sent. The robotic platform may be subjected to various risks associated with this environment and/or operations performed in this environment. Risks may include unplanned or unintended actions, such as falls, collisions, becoming entangled or wedged, and the like. These actions are often the result of lack of perceptual awareness of the environment (either by a human operator or by various autonomous agents).

Examples of Co-Robotic Systems and its Components

Figure 2:
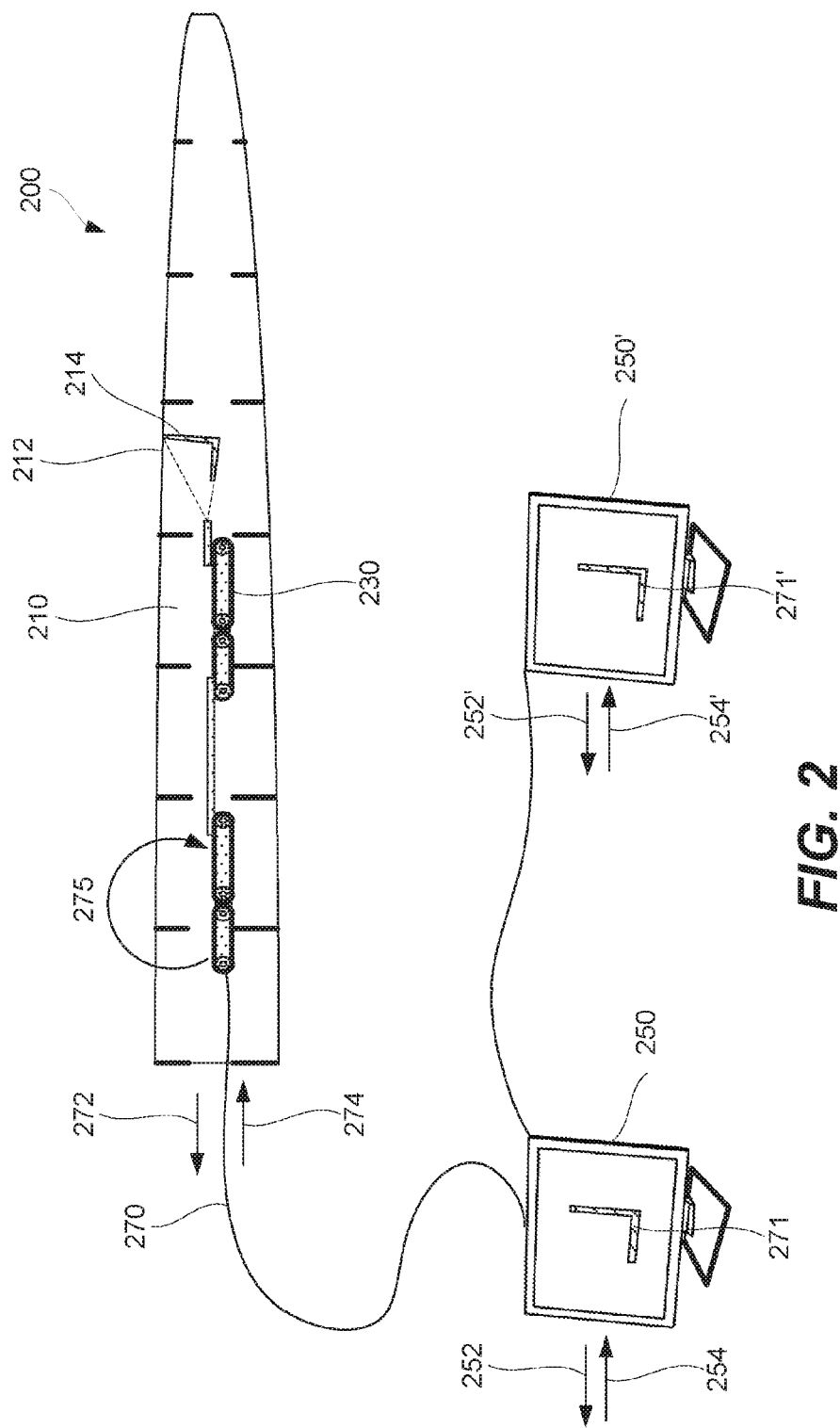
FIG. 2 is an example of a co-robotic system comprising a robotic platform and a remote control station, in accordance with some embodiments.

FIG. 2 is an example of co-robotic system 200 comprising robotic platform 230 and remote control station 250, in accordance with some embodiments. During operation of co-robotic system 200, robotic platform 230 is positioned within confined space 210 of structure 212. While FIG. 2 illustrates an example of structure 212, which is an aircraft wing, one having ordinary skill in the art would understand that any other examples of structure 212 and confined space 210 are also within the scope. Some additional examples of structures 212 and confined space 210 of structure 212 include, but are not limited to, a fuselage, rudders, horizontal stabilizers, flaps, slats, ailerons, keel, crown or other limit access areas of the aircraft. During operation of co-robotic system 200, remote control station 250 is positioned outside of confined space 210 thereby allowing an operator to interact with remote control station 250. While FIG. 2 illustrates an access point positioned at one end of structure 212, one having ordinary skill in the art would understand that other examples of access points are also within the scope. For example, an access point may be provided within a wing tip or, more specifically, within a wing root of a wing tip. In another example, an access point may be in a crown or a keel of a fuselage.

Robotic platform 230 and remote control station 250 are communicatively coupled using, for example, communication link 270. Communication link 270 may be a wired link, a wireless link, or various combinations of the two. Communication link 270 may be established using various communication protocols and/or networks. In some embodiments, communication link 270 may utilize a local area network (LAN), a global communication network (e.g., Internet), and/or the like (where does power (hydraulics, electricity, etc.) run to 230? Is it possible that power is transmitted to 230 via an umbilical running in parallel to 270?). The selection of networks and protocols depend on the proximity of robotic platform 230 and remote control station 250 and other factors. While not shown in FIG. 2, co-robotic system 200 may include a power line (e.g., hydraulic, electrical, pneumatic, and like) extending to robotic platform 230. The power may be supplied to robotic platform 230 from outside of confined space 210. In some embodiments, the power supply may be internal to robotic platform 230.

Figure 5:
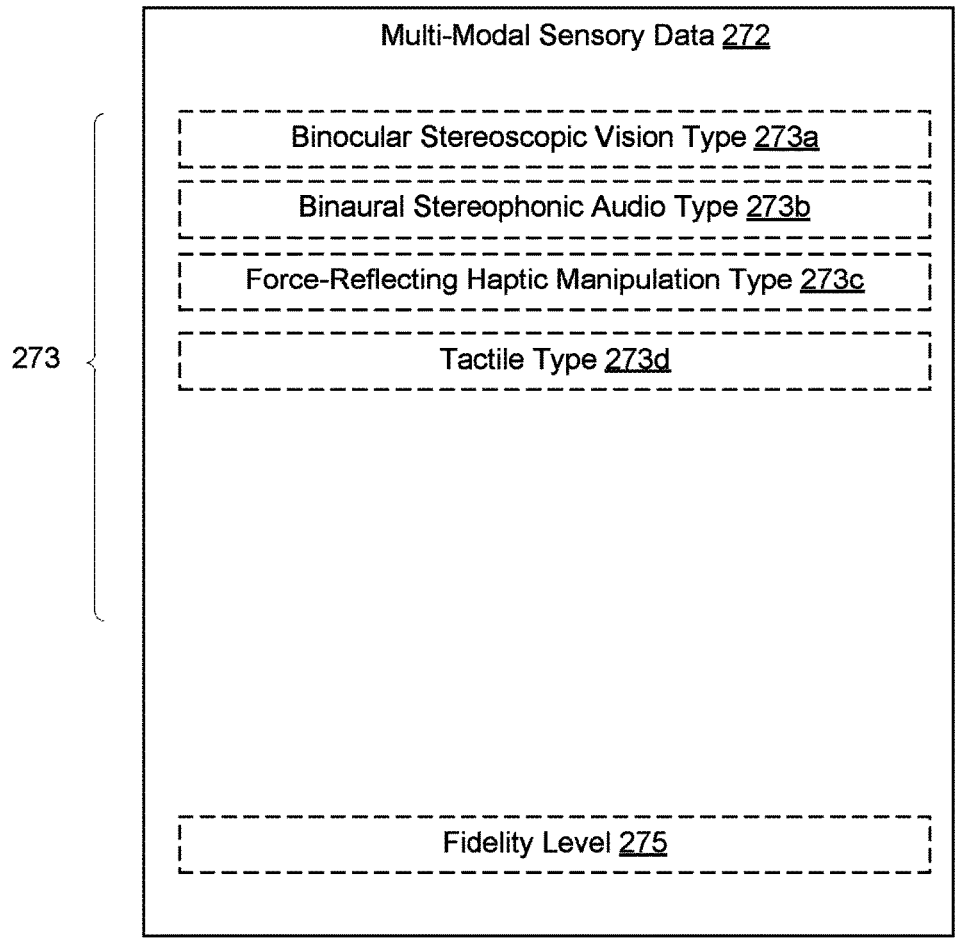
FIG. 5 is a schematic representation of multi-modal sensory data, in accordance with some embodiments.

The multi-modal sensory data is transmitted from robotic platform 230 and remote control station 250 using communication link 270 thereby creating high-fidelity immersive telepresence for the operator of remote control station 250. This type of telepresence provides situation awareness needed for many operations. At the same time, establishing such telepresence may need high-fidelity capture and reproduction of sensory and sensorimotor data obtained by robotic platform 230. Various types of data obtained by robotic platform 230 are collectively referred to as multi-modal sensory data 272. A schematic representation of various components of multi-modal sensory data 272 is presented in FIG. 5. For example, telepresence presentation to an operator may include geometrically-correct binocular stereoscopic viewing systems and high-fidelity stereophonic audio reproduction. In this example, multi-modal sensory data 272 may include binocular stereoscopic vison type 273a and binaural stereophonic audio type 273b. In the same or other example, a force-reflecting manipulation sensor may be used to generate force-reflecting haptic manipulation type 273c.

In some embodiments, co-robotic system 200 may include one or more additional remote control stations 250'. Additional remote control station 250' may be communicatively coupled to primary remote control stations 250 or directly to robotic platform 230. Multiple remote control stations 250 and 250' may be used to have different operators providing user input. Different remote control stations 250 and 250' may be positioned in the same general location (e.g., a job site) or different locations. For example, remote control station 250 may be a local station positioned within a general vicinity of robotic platform 230, while additional remote control station 250' may be distal station positioned in a different location. The control over different remote control stations 250 and 250' may be performed by different parties. For example, local remote control station 250 may be controlled by an aircraft operator (e.g., an airline), airport staff, and/or repair service, while distal remote control station 250 may be controlled by an aircraft manufacturer or the airline headquarters (e.g., with additional knowledge of structure 212).

An operator of additional remote control station 250' may have more specific domain knowledge than, for example, an operator remote control stations 250 and may be able to support multiple different co-robotic systems 200. This is especially useful when an unforeseen condition is detected for which additional expertise is needed. By supporting this collaboration access to a wide variety of distant domain experts, unexpected situations can be addressed rapidly, without the time and cost to co-locate the experts for consultation. For example, an airline could have one expert trained to operate co-robotic system 200 but multiple co-robotic systems 200 or at least multiple robotic platforms 230. These multiple robotic platforms 230 may be at various facilities. The expert may be able to control of each robotic platform 230 when needed without co-locating to that robotic platform 230.

Figure 3:
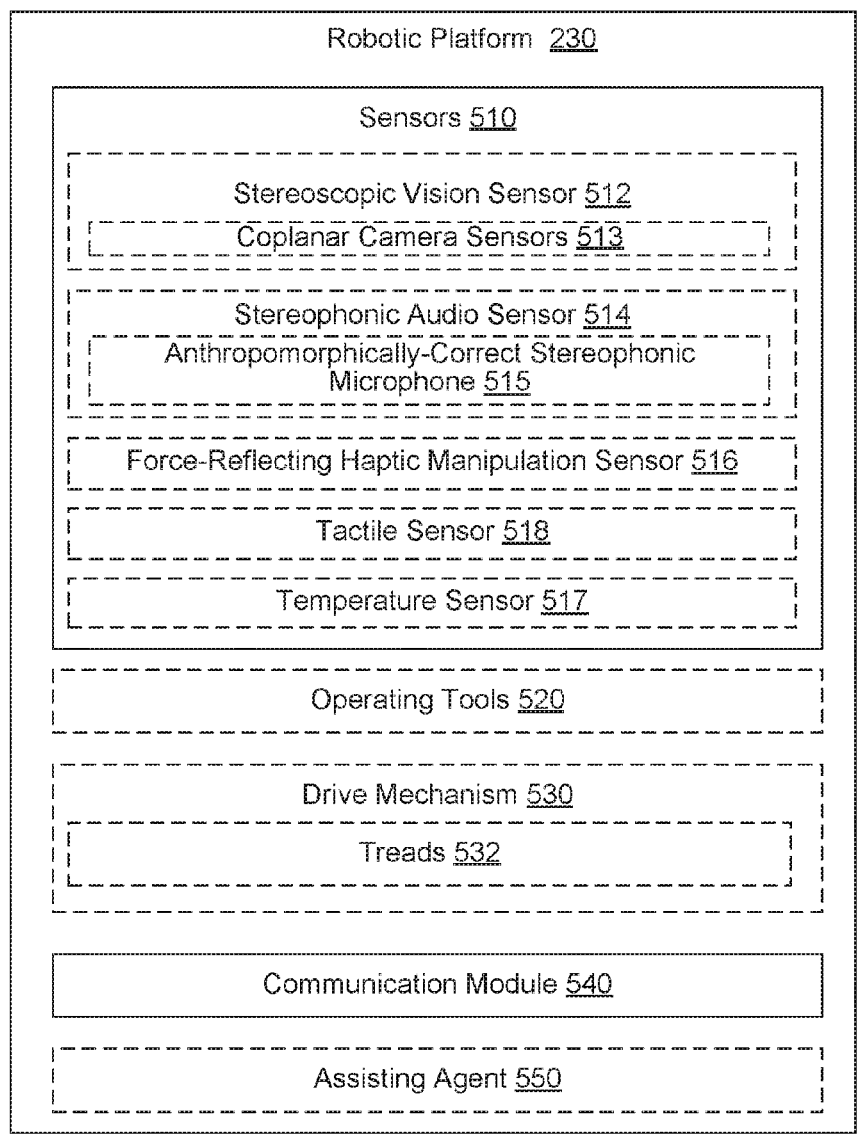
FIG. 3 is a schematic representation of a robotic platform, in accordance with some embodiments.

Each component of co-robotic system 200 will now be described in more detail. FIG. 3 is a schematic representation of robotic platform 230, in accordance with some embodiments. Robotic platform 230 includes different sensors 510 for obtaining multi-modal sensory data. Some examples of sensors 510 include, but not limited to, binocular stereoscopic vision sensor 512, binaural stereophonic audio sensor 514, force-reflecting haptic manipulation sensor 516, tactile sensor 518, and temperature sensor 517. The multi-modal sensory data is a combined output of two or more of these sensors.

The selection of sensors 510 on robotic platform 230 may depend on particular aspects of the multi-modal sensory data. The sensory experience generated at remote control station 250 based on the multi-modal sensory data obtained by sensors 510 on robotic platform 230 may be selected for each particular operation as illustratively presented in TABLE 1.

TABLE 1

| Operation | Binocular Stereoscopic Vision | Binaural Stereophonic Audio | Force-Reflecting Haptic Proprioception | Tactile |
|---|---|---|---|---|
| Move Robotic Platform | YES | YES | — | — |
| Drill | YES | YES | YES | — |
| Install Fastener | YES | YES | YES | YES |
| Seal | YES | — | YES | — |
| Paint | — | — | — | — |
| Remove Object | YES | YES | YES | YES |
| Inspect | YES | — | — | — |

Binocular stereoscopic vision is most useful for any manipulation task, such as placing a fastening tool over a fastener or grasping a dropped fastener, as well as inspection tasks, such as confirming the continuous profile of a sealant bead or distinguishing between a mark that does not need repair from a scratch that does require repair. Binaural stereophonic audio may be useful for situational awareness. For example, binocular stereoscopic vision may provide perception of the operating environment based on sound generated by the robotic platform and reflected from interior surfaces of the confined space. It is also useful listening to tools such as drills for issues such as dulling or breakage. For example, a co-robotic system may have software that automatically monitors the sound portion of the multi-modal sensory data in order to detect operational defects (e.g., sub-optimal drilling may be characterized by distinct sounds). Force-reflecting haptic proprioception may be useful for placing fasteners in holes, or forces on a cleaning pad both pressure and drag during wiping. In some embodiments, a co-robotic system may generate feedback to an operator and/or to one or more automated agents for monitoring the application of force in order to more closely follow operations (e.g., during drilling to detect suboptimal drilling conditions). Tactile sensing may be useful for fine manipulation of tools or components. Finally, vestibular Spatial Orientation is useful to provide perception of the orientation of the remote vehicle or end effector by providing a seat-of-the-pants perception of angles and accelerations. It is also useful for detecting vibration due to motion or scraping of the workpiece, Vision data type 273a or, more specifically, binocular stereoscopic vision data may be a part of overall multi-modal sensory data 272. The vision data may be obtained using optional stereoscopic vision sensor 512 or, more specifically, geometrically-correct binocular stereoscopic cameras and viewing systems.

Vision sensor 512 may achieve geometrically-correct image capture by utilizing two co-planar camera sensors 513. Camera sensors 513 may be modified to shift the center of each sensor off of the lens optical axis to shift the fields of view, allowing a visual area of the fields of view to be coincident. This particular arrangement of camera sensors 513 yields the geometrically-correct image not available with conventional stereo-cameras.

It is insufficient to consider only camera sensors 513 in a geometrically-correct telepresence viewing system. To reproduce reality as if the operator gazes on the scene with un-instrumented eyes, user interface 610 of remote control station 250 may include a particular output device 612, such as display 613a, that also adheres to equivalent geometries. For example, when the vision data is presented in display 613a, it is natural to consider this display 613 as a window "through" which the operator gazes. By strictly adhering to equivalent geometries of a direct view with human eyes through a window for the binocular stereoscopic vision sensors 512, and the view of a virtual image through the screen of display 613 we can accurately reproduce the object scene.

Specifically, the inter-pupillary distance of operators' eyes may be a fixed measurement. The width of the window constrains the angle of view for each eye and defines the area of coincidence when the operator positions his or her eyes such that a line drawn through the two pupils is parallel with the window, and position the cyclopean point (the point between the two pupils) normal to the plane of the window and centered on the aperture of the window. Selection of the effective window aperture is limited by the physical width of the display screen. Incorporating the distance of the viewer's eyes from the display screen completes the system's geometric constraints.

Referring now to anthropomorphic audition, many subtle depth and manipulation cues are processed subconsciously through human's stereophonic hearing. At the same time, addition of this sensory modality to co-robotic system 200 is relatively simple, while the situational awareness it provides of the tele-presently perceived environment is substantial. Binaural audition data at a normal human scale may be provided by stereophonic audio sensor 514 or, more specifically, by anthropomorphically-correct stereophonic microphone 515. Stereophonic audio sensor 514 is a part of robotic platform 230 as, for example, shown in FIG. 3. For scaled stereophonic audition (e.g., to complement the scaled stereoscopic vision identified above), stereophonic audio sensor 514 may be high-fidelity miniature microphones. While many of the same binaural localization cues (e.g., intensity, timbre, spectral qualities, reflections in the confined space) may be maintained, the timing cues and phase cues in certain frequency bands may be reduced or altered, for example, if the interaural distance is altered.

Referring now to force-reflecting haptic teleoperation, humans are very capable of navigating without vision (e.g., walking through a dark room) using touches and gentle bumping into objects. Force-reflecting haptic manipulation type 273c may be a low bandwidth type of multi-modal sensory data 272. For interacting with the remote environment, force-feedback actuators and posture proprioception add for presenting sensorimotor controls. For example, co-robotic system 200 may utilize a robotic hand and arm (which may be parts of one or both of sensors 510 and operating tools 520) with force-reflecting exo-skeleton controls (which may be parts of user interface 610 and include both output devices 612 and input devices 614). This approach allows the operator to perform a wide variety of operations naturally. In some embodiments, remote control station 250 includes a 4-axis force-feedback arm, a two-fingered force-feedback hand, and a force-reflecting exo-skeleton for fingers and arm. The reproduction of gross forces at the hand allows proprioception, or kinesthesia, which is the self-sense of the position of limbs and other parts of the body. This provides a significant additional cue to the immersive visual tele-perception and overall enhancement of multi-modal sensory data 272.

Referring now to vestibular spatial orientation, the attitude (orientation) of robotic platform 230 or an operating tool (e.g., an end-effector) of robotic platform 230 may be relayed to remote control station 250 as a part of multi-modal sensory data 272. This attitude may be reproduced by adjusting the attitude of the platform or an operator chair to achieve the vestibular spatial orientation feedback. This feedback may be performed at relatively low frequencies in comparison to other sensory types. Furthermore, the feedback may be scaled and/or limited for safety and other reasons (e.g., to prevent leaning the operator beyond the tipping point (e.g., effectively causing the operator to fall) while providing this feedback). An inertial measurement unit will be incorporated into the distal robotic systems, and relayed to three actuators that will drive the tele-supervisor's support platform.

Robotic platform 230 also includes communication module 540 for communicatively coupling to remote control station 250 positioned outside of confined space 210. Some examples of communication module 540 include modems (wired or wireless) and the like. In some embodiments, communication module 540 is a wireless communication module.

In some embodiments, robotic platform 230 further comprises operating tool 520 for performing one or more operations within confined space 210. Some examples of operating tools 520 include, but are not limited to, a drill, a rivet gun, a sealant applicator, and an inspection device.

In some embodiments, robotic platform 230 further comprises drive mechanism 530 for changing position of robotic platform 230 within confined space 210. One example of drive mechanism 530 is a set of treads coupled to a motor. However, other examples are also within the scope. While robotic platform 230 is shown as a treaded vehicle in FIG. 2, any types of robotic platform 230 capable of generating multi-modal sensory data are within the scope.

In some embodiments, robotic platform 230 and/or remote control station 250 may include one or more optional assisting agents (block 550 in FIG. 3 and block 650 in FIG. 4) to assist the human operator with various control operations of co-robotic system 200. Specifically, an assisting agent may utilize the multi-modal sensory data obtained by robotic platform 230 to provide some level of control to robotic platform 230, modify the multi-modal sensory data prior to generating the representation of this data to the operator, and/or to modify the control instructions generated based on the user input. This provides some level of automation. For example, the assisting agent may autonomously monitor, interpret, indicate, automate, and limit operations of robotic platform 230. In some embodiments, one or more task domains of co-robotic system 200 is analyzed and defined allowing their modular development, testing, and incorporation using an assisting agent. For example, an assist agent may perform navigation functions, task-specific planning, and monitoring. Co-robotic system 200 supports fall-forward/fallback cooperation between its one or more autonomous agents and user input.

Figure 4:
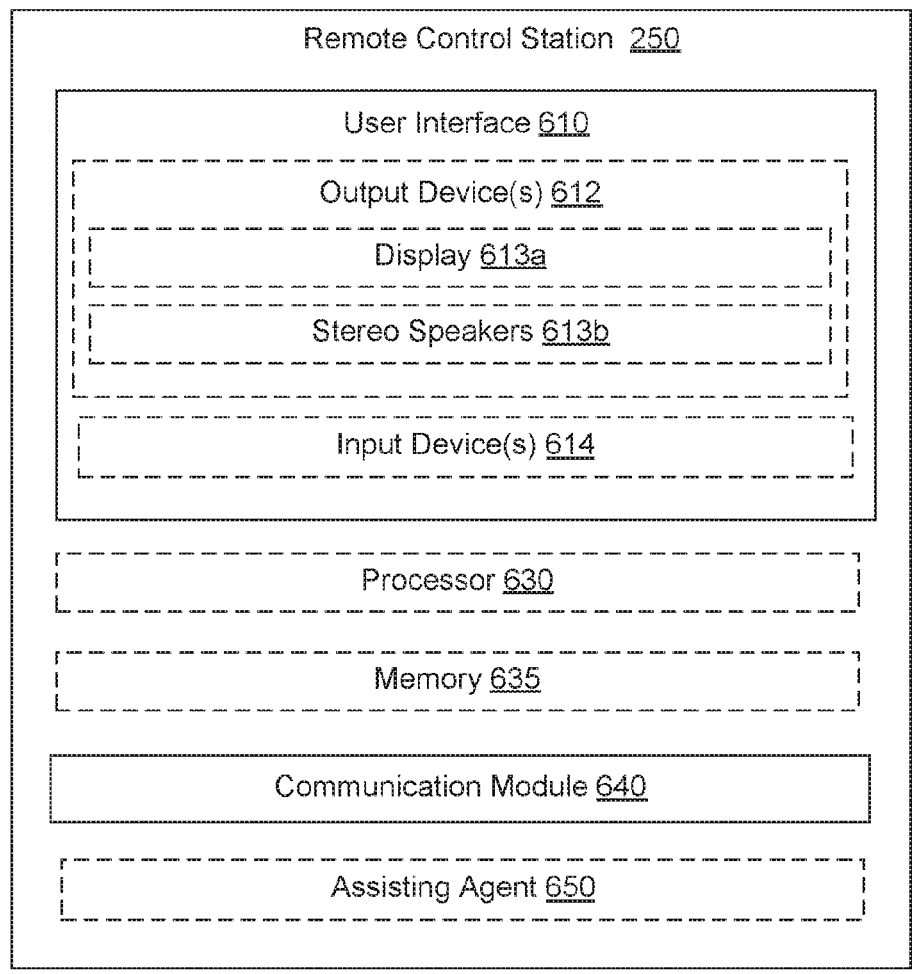
FIG. 4 is a schematic representation of a remote control station, in accordance with some embodiments.

FIG. 4 is a schematic representation of remote control station 250, in accordance with some embodiments. Remote control station 250 comprises user interface 610 for generating one or more representations of the multi-modal sensory data and/or for capturing user input. Specifically, user interface 610 may include one or more output devices 612, some examples of which include, but are not limited to, a display (e.g., a 3-D display), and speakers (e.g., a set of stereophonic speakers). Furthermore, user interface 610 may include one or more input devices 614.

Remote control station 250 also comprises communication module 640 for communicatively coupling to robotic platform 230 while robotic platform 230 is within confined space 210. Communication module 640 may be the same type as communication module of platform 230. In some embodiments, remote control station 250 also comprises processor 230 for generating control instructions for robotic platform 230 and memory 635 for storing these instructions and multi-modal sensory data 272.

As noted above, remote control station 250 may also include one or more optional assisting agents 650. Operations of user interface 610 may be integrated with operations assisting agents 650 such that the multi-modal sensory data may be modified prior to presenting it on user interface 610. In some embodiments, user input captured by user interface 610 may be modified by assisting agents 650 prior to generating control instructions for robotic platform 230.

In some embodiments, high-level human supervision of autonomous actions is supported by intelligent assisting agents. This approach incorporates greater autonomy to various tasks, such as, safe path planning and navigation, automatic task-specific operations, or system 'health' monitoring.

Overall, remote control station 250 may be a hub of planning, control, and collaboration of entire co-robotic system 200. Remote control station 250 may be involved in mobility, manipulation, tele-sensing, autonomous agent tasking, and other operations of co-robotic system 200. Remote control station 250 may provide a portal to facilitate remote experts' collaboration (e.g., including multiple experts and/or assisting agents).

Remote control station 250 supports direct human operation or, more specifically, teleoperation by providing situation awareness through immersive multi-sensory high-fidelity presence. Furthermore, remote control station 250 may provide precise physical interaction through haptic teleoperation. The augmented human operation may be supported by autonomous agents, for example, to monitor for safety, and to assist the worker. Scaling various aspects of the multi-modal sensory data (e.g., scaling vision data) provides better matching of the actual environment and operator's perception and senses. Furthermore, remote control station 250 may provide augmenting the spectra of vision, audition, spatial orientation, and proprioception.

Examples of Operating Co-Robotic Systems and its Components

Figure 6:
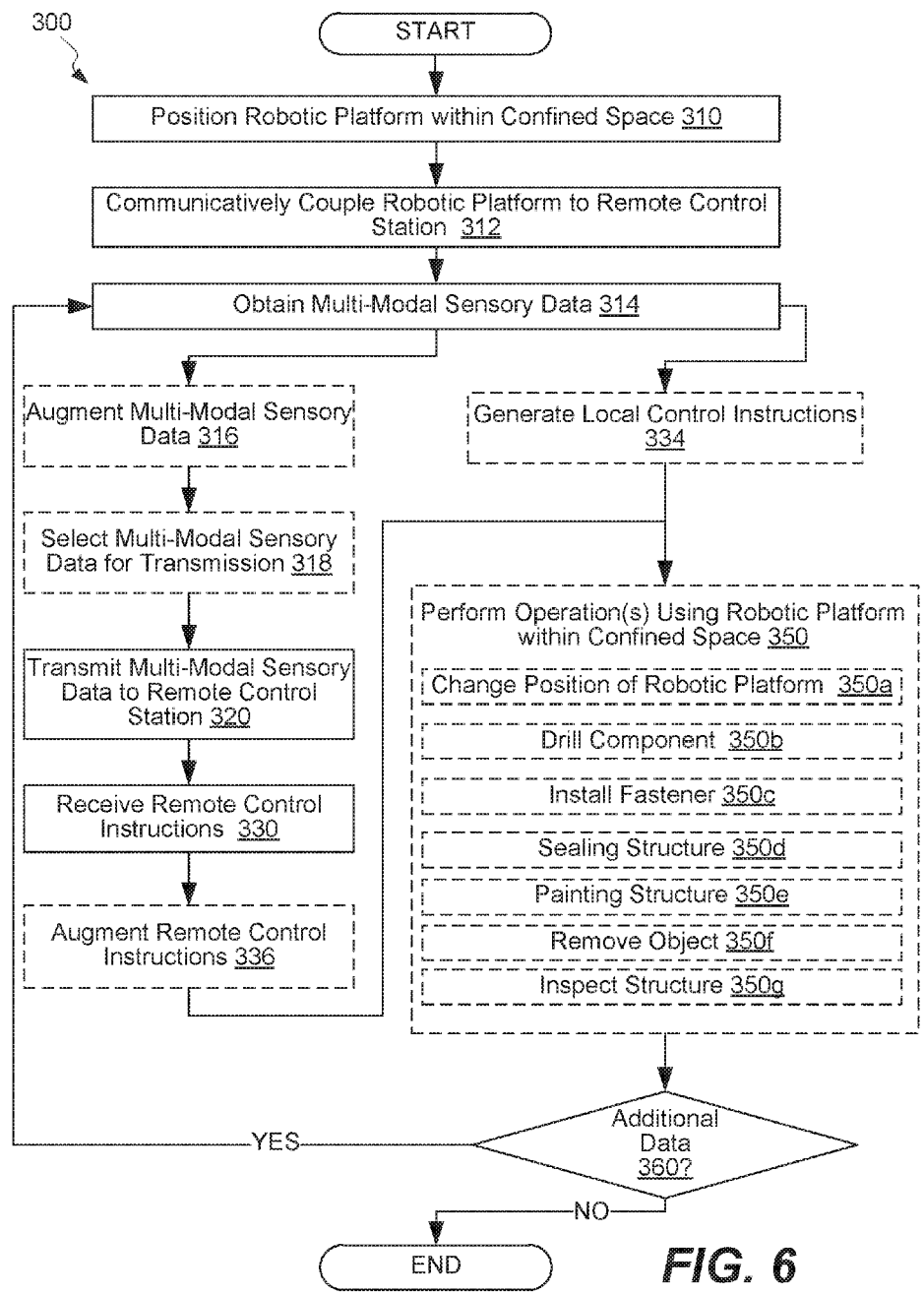
FIG. 6 is a process flowchart corresponding to a method for remotely controlling of a robotic platform in a confined space, in accordance with some embodiments.

FIG. 6 is a process flowchart corresponding to method 300 for remotely controlling of robotic platform 230 in confined space 210, in accordance with some embodiments. The control is performed based on multi-modal sensory data. Specifically, method 300 refers to operations performed by robotic platform 230. Operations performed at or by remote control station 250 are described below with reference to FIG. 7. One having ordinary skills in the art would understand that both sets of operations are parts of the same operating scheme of co-robotic system 200 even though they can be performed by different parties, such as one party controlling operations of robotic platform 230 and another party controlling operations of remote control station 250.

Method 300 may commence with positioning robotic platform 230 within confined space 210 of structure 212 during operation 310. Structure 212 may be an aircraft wing or any other structure that, for example, may not be suitable for humans to operate in. This positioning operation may involve advancing (e.g., driving) robotic platform 230 into and within confined space 210 based on control instructions generated at robotic platform 230 (e.g., autonomous or semi-autonomous movement) and/or generated at remote control station 250 and transmitted to robotic platform 230. Specifically, robotic platform 230 may include drive mechanism 530 as further described above with reference to FIG. 3 and this drive mechanism 530 may be utilized for positioning robotic platform 230 within confined space 210. Alternatively, robotic platform 230 does not have any drive mechanisms and it may be positioned within confined space 210 manually.

It should be noted that while positioned in confined space 210, robotic platform 230 is communicatively coupled to remote control station 250 positioned outside of confined space 210. In some embodiments, method 300 may involve an operation at which communicative coupling between robotic platform 230 and remote control station 250 is established, such as operation 312 shown in FIG. 6

Once robotic platform 230 is positioned within confined space 210, method 300 may proceed with obtaining multi-modal sensory data 272 during operation 314. Multi-modal sensory data 272 may be obtained using two or more sensors 510 of robotic platform 230. Multi-modal sensory data 272 may include at least two different types 273 of sensory responses, such as binocular stereoscopic vision type 273*a*, binaural stereophonic audio type 273*b*, force-reflecting haptic manipulation type 273*c*, and tactile type 273*b*. Various aspects of multi-modal sensory data 272 are described above.

In some embodiments, method 300 involves augmenting multi-modal sensory data 272 during optional operation 316. In general, multi-modal sensory data 272 may be augmented prior to transmitting it to remote control station 250 (e.g., at robotic platform 230) or after transmitting (e.g., at remote control station 250). In either case, augmentation of multi-modal sensory data 272 may be performed by autonomous agents. Specifically, the agents may autonomously monitor, interpret, indicate, automate, and limit multi-modal sensory data 272.

For example, a visual augmentation agent may address autonomous detection of visual features-of-interest. This agent may identify these features to the operator using, for example, a 3D visual overlay presented on the user interface. The overlay may be aligned with the actual image of the environment. The operator may be able to turn off the visual augmentation agent to reduce distraction. The feature set may be selected from task-specific needs and may include automatic detection of missing components such as fasteners, coating flaws, and items that should not be present (foreign object debris), such as dropped fasteners or tools, or excess coating material. Different types of inspections are within the scope.

Another example of a visual augmentation agent may address localization within the confined working spaces using sensors. For example, a three-dimensional map of the working space may be build using this agent based on one or more components of the multi-modal sensory data, such as the vision component and/or the touch component A separate virtual display may be presented to the operator. This display may show the mapped space and the current position of robotic platform 230 within the space. This reference map may provide a non-immersive higher-level situation awareness. This example of the visual augmentation agent may also include controls, such as point-of-view adjustment.

Another example is a physical augmentation agent, which may provide selective scaling of movement, force, and limiting of force-reflection based on the task and operator requirements. The same or another physical augmentation agent may utilize the localization data described above. For example, based on the mapped workspace and the position and posture of deployed robotic platform 230, the intelligent assisting agent may determine safe work-zones and restricted zones (e.g., to prevent unwanted collisions or damage). These zones may be updated in real time as multi-modal sensory data 272 is being obtained.

One example of augmentation is scaling. Scaling of one or more types of multi-modal sensory data 272 may be used to present data 272 in a format more naturally understood by the operator, e.g., more in line with the scale of the operator. This type of scaling may be referred to as scaling of the human operator. In some embodiments, the scaling may be performed using one or more agents described above. Scaling is a powerful expansion of the perceptual capabilities of the vision and/or other components. Modifying the effective scale of vision type 273*a* of multi-modal sensory data 272 may not involve changing the magnification of cameras 513 as this introduces depth distortions along the optical axis. It may be achieved by changing the inter-pupillary distance of the camera lenses that a scaled viewing geometry is achieved.

Method 300 may proceed with transmitting the multi-modal sensory data during operation 320. The data is transmitted from robotic platform 230 positioned in confined space 210 to remote control station 250 positioned outside of confined space 210.

Method 300 then proceed with receiving remote control instructions from remote control station 250 during operation 330. The remote control instructions are received by robotic platform 230 using communication link 270 and are generated by remote control station 250. Generations of these remote control instructions is further described below with reference to FIG. 7. Briefly, these remote control instructions may be generated based on user input 254 and/or by various assisting agents 650, which may be provided at remote control station 250. The remote control instructions should be distinguished from local control instructions generated by robotic platform 230.

In some embodiments, method 300 involves generating local control instructions at robotic platform 230 during optional operation 334. The local control instructions may be generated based on the multi-modal sensory data.

In some embodiments, method 300 further comprises performing one or more operations within the confined space using the robotic platform during optional operation 350. Operation 350 may be performed at least based on the remote control instructions received from remote control station 250 at robotic platform 230. In some embodiments, local control instructions may be also used for operation 350. Some examples of operation 350 include, but are not limited to, changing position of robotic platform 230 within confined space 210 (block 350*a*), drilling component 214 of structure 212 (block 350*b*), installing a fastener into structure 216 (block 350c), sealing structure 212 (block 350d), painting structure 212 (block 350e), removing an object from confined space 210 (block 350f), and inspecting structure 212 (block 350g). One having ordinary skill in the art would understand that various other examples of operation 350 are also within the scope.

For example, the operation may be changing the position of the robotic platform within the confined space. In this example, the multi-modal sensory data may comprise at least the binocular stereoscopic vision type and the stereoscopic audio type.

In another example, the operation may comprise drilling the component of the structure. The multi-modal sensory data may comprise at least the binocular stereoscopic vision type, the stereoscopic audio type, and the force-reflecting haptic manipulation type.

In yet another example, the operation may comprise installing the fastener into the structure. The multi-modal sensory data may comprise at least the binocular stereoscopic vision type, the stereoscopic audio type, the force-reflecting haptic manipulation type, and the tactile type.

The fidelity level of the multi-modal sensory data may correspond to the one or more operations. Some operations may require a higher fidelity level than other operations. Furthermore, the fidelity level of the multi-modal sensory data may change overtime.

Figure 7:
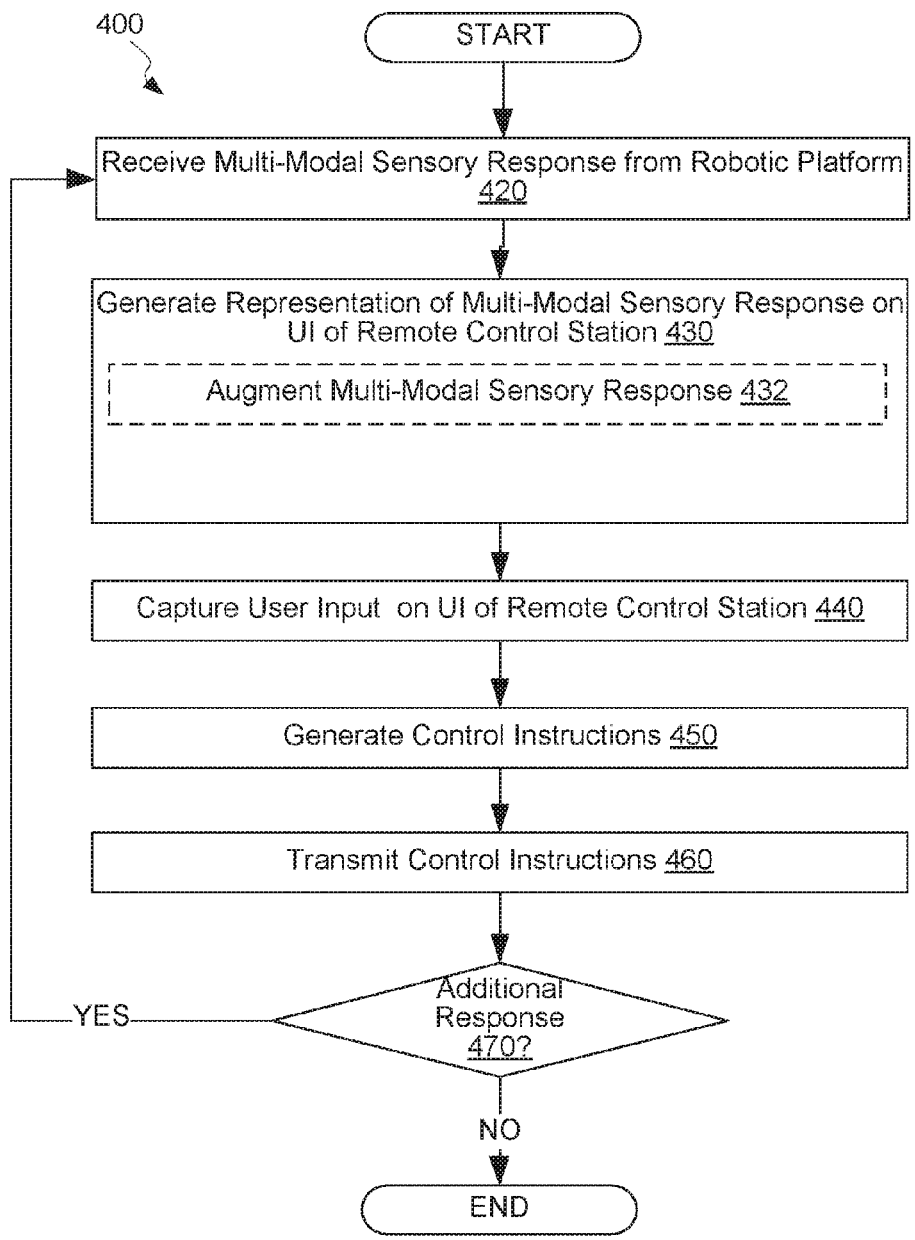
FIG. 7 is a process flowchart corresponding to a method for remotely controlling of a robotic platform in a confined space from a perspective of a remote control station, in accordance with some embodiments.

FIG. 7 is a process flowchart corresponding to method 400 for remotely controlling of robotic platform 230 in confined space 210 from a perspective of remote control station 250, in accordance with some embodiments. The control is performed based on multi-modal sensory data. The operations of method 400 are performed by remote control station 250. Operations performed at or by robotic platform 230 are described above with reference to FIG. 6.

Method 400 may commence with receiving the multi-modal sensory data from robotic platform 230 during operation 420. During this receiving operation, robotic platform 230 is positioned in confined space 210. The multi-modal sensory data is received by remote control station 250 positioned outside of confined space 210. Furthermore, remote control station 250 is communicatively coupled to robotic platform 230. As noted above, the multi-modal sensory data may comprise at least two of the following sensory response types: a binocular stereoscopic vision type, a binaural stereophonic audio type, a force-reflecting haptic manipulation type, and a tactile type.

Method 400 may proceed with generating a representation of the multi-modal sensory data at the remote control station during operation 430. In some embodiments, this representation generating operation comprises augmenting the multi-modal sensory data based on at least one of video spectrum, audio spectrum, spatial orientation, and proprioception. The representation may be a multi-sensory high-fidelity telepresence.

In some embodiments, the representation is generated on user interface 610 of remote control station 250. User interface 610 or, more specifically, output device 612 of user interface 610 may comprise 3D display 613a generating 3D images based on the multi-modal sensory data. In the same or other embodiments, user interface 610 comprises stereo speakers 613b generating stereo sound on the binaural stereophonic audio type of the multi-modal sensory data.

Method 400 may proceed with capturing user input at the remote control station during operation 440. The remote control instructions may be generated based on the user input. In some embodiments, at least some of the remote control instructions are generated by remote control station 250 without the user input.

Method 400 may proceed with transmitting the remote control instructions to robotic platform 230 during operation 460. During this operation, robotic platform 230 is positioned in confined space 210. The remote control instructions may represent one or more operations performed by robotic platform 230 within confined space 210. Some examples of these operations are presented above.

In some embodiments, data receiving operation 420 and representation generating operation 430 are performed continuously.

Examples of Aircraft and Methods of Fabricating and Operating Aircraft

Figure 8:
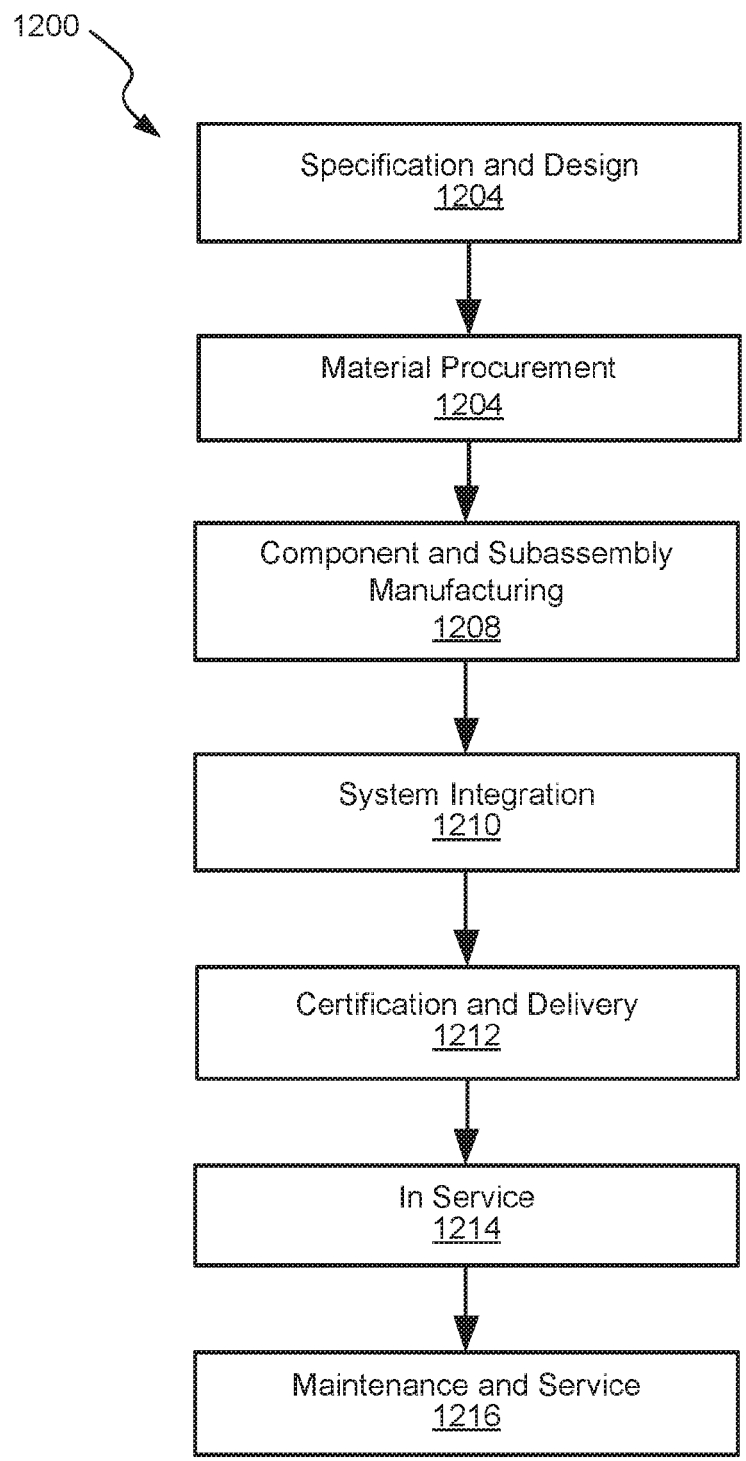
FIG. 8 is a block diagram of aircraft production and service methodology that may utilize methods and assemblies described herein.

Examples of the present disclosure may be described in the context of aircraft manufacturing and service method 1200 as shown in FIG. 8 and aircraft 100 as shown in FIG. 1. During pre-production, illustrative method 1200 may include specification and design (block 1204) of aircraft 100 and material procurement (block 1206). During production, component and subassembly manufacturing (block 1208) and inspection system integration (block 1210) of aircraft 100 may take place. Described methods and assemblies may involve remotely controlling of a robotic platform based on multi-modal sensory data as described above and can be used in any of specification and design (block 1204) of aircraft 100, material procurement (block 1206), component and subassembly manufacturing (block 1208), and/or inspection system integration (block 1210) of aircraft 100.

Thereafter, aircraft 100 may go through certification and delivery (block 1212) to be placed in service (block 1214). While in service, aircraft 100 may be scheduled for routine maintenance and service (block 1216). Routine maintenance and service may include modification, reconfiguration, refurbishment, etc. of one or more inspection systems of aircraft 100. Described methods and assemblies may involve remotely controlling of a robotic platform based on multi-modal sensory data as described above. This approach may be used in any of certification and delivery (block 1212), service (block 1214), and/or routine maintenance and service (block 1216).

Each of the processes of illustrative method 1200 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

As shown in FIG. 1, aircraft 100 produced by illustrative method 1200 may include airframe 150 with an interior 170. As previously described, aircraft 100 further includes wings 120 coupled to airframe 150, with engines 130 coupled to wings 120. Airframe 150 further includes a number of high-level inspection systems such as electrical inspection system 140 and environmental inspection system 160. Any number of other inspection systems may be included. Although an aerospace example is shown, the principles disclosed herein may be applied to other industries, such as the automotive industry. Accordingly, in addition to aircraft 100, the principles disclosed herein may apply to other vehicles, e.g., land vehicles, marine vehicles, space vehicles, etc.

Apparatus(es) and method(s) shown or described herein may be employed during any one or more of the stages of manufacturing and service method (illustrative method 1200). For example, components or subassemblies corresponding to component and subassembly manufacturing (block 1208) may be fabricated or manufactured in a manner similar to components or subassemblies produced while aircraft 100 is in service (block 1214). Also, one or more examples of the apparatus(es), method(s), or combination thereof may be utilized during production stages (block 1208) and (block 1210), for example, by substantially expediting assembly of or reducing the cost of aircraft 100. Similarly, one or more examples of the apparatus or method realizations, or a combination thereof, may be utilized, for example and without limitation, while aircraft 100 is in service (block 1214) and/or during maintenance and service (block 1216).

Conclusion

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method for remotely controlling of a robotic platform based on multi-modal sensory data, the method comprising:
    positioning the robotic platform in a confined space of an aircraft component,
        the robotic platform comprises a set of treads and a motor, configured to change position of the robotic platform in the confined space;
    communicatively coupling the robotic platform to a remote control station;
    obtaining the multi-modal sensory data using two or more sensors of the robotic platform,
        the multi-modal sensory data comprising at least two sensory response types;
    scaling the at least two of the multi-modal sensory data using a different scale for each of the at least two of the multi-modal sensory data thereby matching perception and sensory capabilities of an operator with a size of the confined space and a task of the robotic platform in the confined space;
    transmitting at least a portion of the multi-modal sensory data from the robotic platform to the remote control station; and
    receiving remote control instructions from the remote control station at the robotic platform, the remote control instructions generated based on at least the portion of the multi-modal sensory data.

2. The method of claim 1, wherein transmitting at least the portion of the multi-modal sensory data is performed while the robotic platform is positioned in the confined space.

3. The method of claim 1, wherein the multi-modal sensory data comprises at least two sensory response types selected from the group consisting of a binocular stereoscopic vision type, a binaural stereophonic audio type, a force-reflecting haptic manipulation type, and a tactile type.

4. The method of claim 1, further comprising generating local control instructions at the robotic platform based on the multi-modal sensory data.

5. The method of claim 4, further comprising performing one or more operations within the confined space using the robotic platform based on the local control instructions.

6. The method of claim 1, wherein the multi-modal sensory data comprising at least a binocular stereoscopic vision type, a binaural stereophonic audio type, and a force-reflecting haptic manipulation type.

7. The method of claim 6, further comprising performing one or more operations within the confined space using the robotic platform, wherein the one or more operations comprise drilling the aircraft component.

8. The method of claim 1, wherein the multi-modal sensory data comprising at least a binocular stereoscopic vision type, a binaural stereophonic audio type, a force-reflecting haptic manipulation type, a the tactile type.

9. The method of claim 8, further comprising performing one or more operations within the confined space using the robotic platform, wherein the one or more operations comprise installing a fastener into the aircraft component.

10. The method of claim 1, wherein obtaining the multi-modal sensory data and transmitting the multi-modal sensory data are repeatedly continuously.

11. The method of claim 1, further comprising augmenting the multi-modal sensory data prior to transmitting at least the portion of the multi-modal sensory data, wherein augmenting is selected from the group consisting of autonomously detecting visual features and generating a three-dimensional map of the confined space.

12. The method of claim 1, further comprising selecting at least the portion of the multi-modal sensory data for transmitting.

13. The method of claim 1, further comprising performing one or more operations within the confined space using the robotic platform based on the remote control instructions received from the remote control station at the robotic platform.

14. The method of claim 13, wherein the one or more operations are selected from the group consisting of:
    changing position of the robotic platform within the confined space,
    drilling the aircraft component,
    installing a fastener into the aircraft component,
    sealing the aircraft component,
    painting the aircraft component,
    removing an object from the confined space, and
    inspecting the aircraft component.

15. The method of claim 13, wherein a fidelity level of the multi-modal sensory data corresponds to the one or more operations.

16. The method of claim 13, wherein a fidelity level of the multi-modal sensory data changes over time.

17. The method of claim 13, wherein the one or more operations are performed also based on local control instructions generated at the robotic platform such that the local control instructions are combined with the remote control instructions to perform the one or more operations.

18. The method of claim 1, wherein the at least two of the multi-modal sensory data comprises a binocular stereoscopic vision data and a force-reflecting haptic manipulation data, and wherein scaling the at least two of the multi-modal sensory data using the different scale for each of the at least two of the multi-modal sensory data comprises scaling up the binocular stereoscopic vision data and scaling down the force-reflecting haptic manipulation data.

19. A method for remotely controlling of a robotic platform in a confined space based on multi-modal sensory data, the method comprising:

receiving the multi-modal sensory data from the robotic platform positioned in the confined space of an aircraft component, the robotic platform comprises a set of treads and a motor, configured to change position of the robotic platform in the confined space, the multi-modal sensory data being received by a remote control station communicatively coupled to the robotic platform, the multi-modal sensory data comprising at least two sensory response types selected from the group consisting of a binocular stereoscopic vision type, a binaural stereophonic audio type, a force-reflecting haptic manipulation type, and a tactile type; and scaling the at least two of the multi-modal sensory data using a different scale for each of the at least two of the multi-modal sensory data thereby matching perception and sensory capabilities of an operator with a size of the confined space and a task of the robotic platform in the confined space;

generating a representation of the multi-modal sensory data by the remote control station based on at least a portion of the multi-modal sensory data;

capturing user input at the remote control station; and transmitting remote control instructions to the robotic platform positioned in the confined space.

* * * * *